United States Patent
Salzberger

[19]

[11] Patent Number: 6,079,664
[45] Date of Patent: Jun. 27, 2000

[54] MID-AIR CARGO RELAY SYSTEM

[76] Inventor: Marc Salzberger, 84-42 Fleet Ct., Middle Village, N.Y. 11379

[21] Appl. No.: 08/689,205

[22] Filed: Aug. 5, 1996

[51] Int. Cl.$^7$ .................. B64D 1/00; B64D 9/00
[52] U.S. Cl. ...................... 244/1 TD; 244/135 A; 244/137.1
[58] Field of Search .......... 244/1 TD, 2, 135 A, 244/137.1, 137.4

[56] References Cited

U.S. PATENT DOCUMENTS

| | | | |
|---|---|---|---|
| 2,124,867 | 7/1938 | Akerman | 244/135 A |
| 2,166,575 | 7/1939 | Atcherley | 244/135 A |
| 2,193,312 | 3/1940 | Cobham et al. | 244/135 A |
| 2,261,598 | 11/1941 | Tyson | 244/137.1 |
| 2,373,086 | 4/1945 | Alabrune | 244/137.1 X |
| 2,692,121 | 10/1954 | Brown | 244/137.1 X |
| 3,167,278 | 1/1965 | Roberge | 244/137.4 |
| 5,103,712 | 4/1992 | Minovitch | 244/137.1 X |
| 5,188,313 | 2/1993 | Piasecki | 244/135 A X |

FOREIGN PATENT DOCUMENTS

| | | | |
|---|---|---|---|
| 254494 | 10/1989 | Japan | 244/2 |
| 1684165 | 10/1991 | U.S.S.R. | 244/2 |

*Primary Examiner*—William Grant

[57] ABSTRACT

A mid-air transshipment system wherein a cargo carrying, pallet/airfoil is towed by a supply plane. The pallet is roofed by a bi-wing mounted on shock absorbers within its cavity. It trails a cable and a drogue which is speared by the probe of a pursuing aircraft. In coordination with is supply plane the receiving aircraft maneuvers the pallet towards a wing pylon or an internal cargo bay. The attachment method includes winching the pallet up against the aircraft's deployed landing gear. Once secured, zippered seams in the pallet's walls allow the aircraft to disencumber itself of unessential pallet elements.

9 Claims, 7 Drawing Sheets

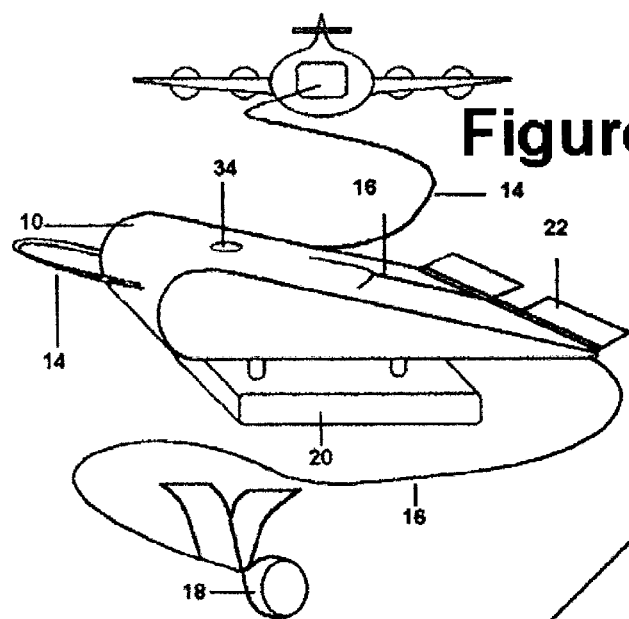
Figure 1a
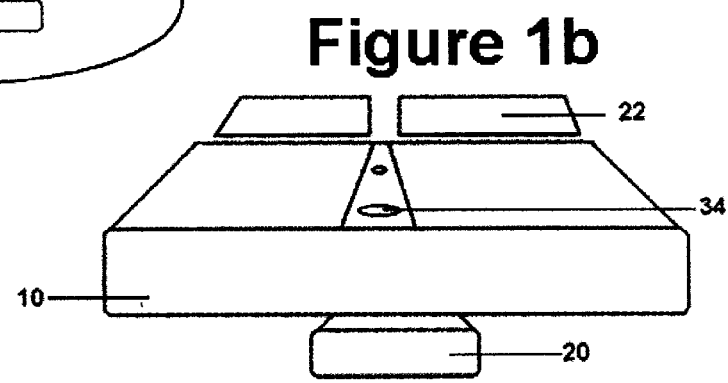
Figure 1b
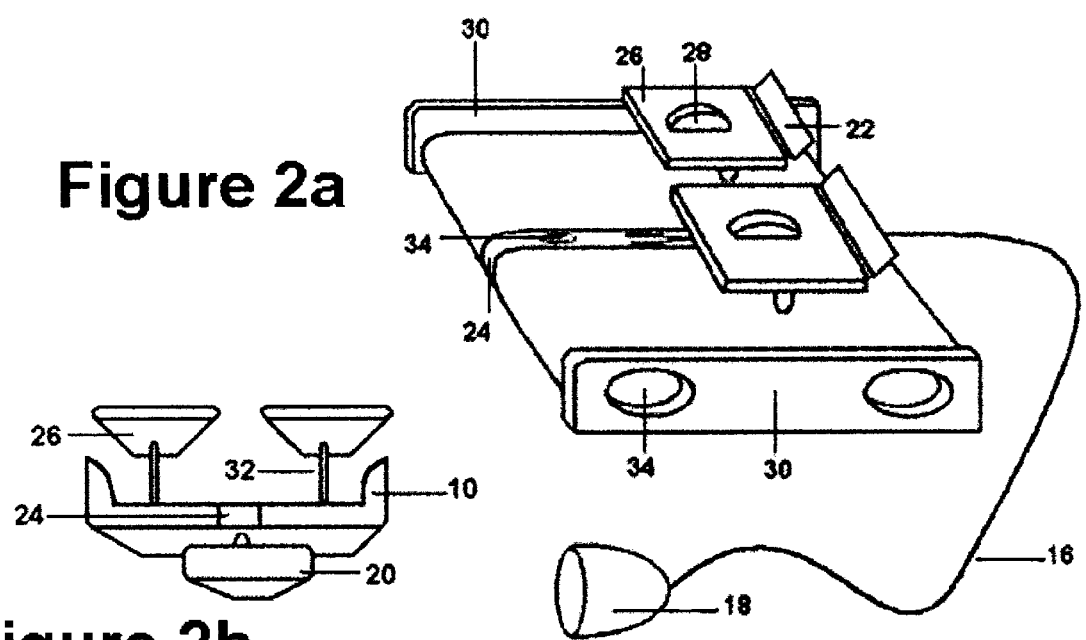
Figure 2a
Figure 2b

MID-AIR CARGO RELAY SYSTEM

BACKGROUND

1. Field of Invention

This invention relates to the ferrying of cargo in mid-air between aircraft.

2. Description of Prior Art

While aerial refueling has extended the range of aircraft, the necessity to land in order to transfer cargo remains for certain purposes a costly restriction. The present invention aspires to overcome this limitation by detailing a system whereby cargo can be ferried between flying aircraft.

OBJECTS ADVANTAGES

An airfreight service, delivering cargo to dispersed communities, can shorten delivery time and reduce costs by transshipping from jumbo transports to smaller local planes. Outlying communities presently denied affordable air delivery service because of inadequate facilities would benefit as well. And the invention has implications for the mid-air refueling and rearming of military aircraft.

BRIEF DESCRIPTION OF THE DRAWINGS

FIG. 1A is a perspective illustration of a pallet and supply aircraft for use in the invention.

FIG. 1B is a perspective illustration of a pallet with attached cargo.

FIGS. 2A and 2B illustrate an alternate embodiment of the pallet which uses elastically mounted stabilizers.

DESCRIPTION AND OPERATION

Figure 3A:
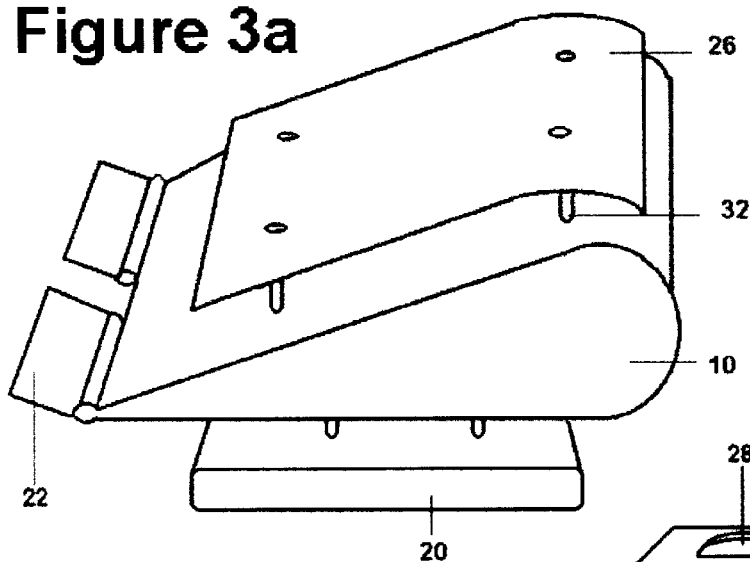
FIGS. 3A, 3B, 4A, 4B, 4C and 5 show alternate embodiments and more detailed features of the pallet.

In Summary: The endeavor is to move cargo in mid-air from one plane to another. Here disclosed is an approach which rafts cargo between airplanes. The system involves a) a vehicle whereon carried, b) mechanisms located on the receiving aircraft, such as attachment fittings, a camera, landing gear, a which and a grappling pod, wherewith the vehicle is docked, and c) maneuvering techniques whereby the equipment is employed.

The Vehicle: As depicted in FIGS. 1A to 8, the vehicle is a pallet 10 in the shape of a cambered airfoil which is demountably tethered 14 to a supply aircraft 12. The preferred embodiment is for storage purposes compactable and is made substantially of a lightweight pliable fiber. It can carry cargo internally as well as suspended from its underside and can serve as an auxiliary fuel tank.

At least one rib of steel-strength material forms the pallet's hard-point 24. This rib, and a pallet 10 may have several, enables it to support cargo 20 and is central to its structure and to the struts and seams which shape its walls. In fuel tank embodiments a fuel tube runs from the pallet's interior cavity up through the body of this rib/hard-point 24 and emerges on its upper surface. Also surfacing there are latch connections at 34 and electrical contacts flowing up from the cargo fittings on the pallet's underside.

In one embodiment certain seams in the pallet walls are zippered. They will unzipper when exposed to a specific pressure. In this way a receiving aircraft can jettison substantial portions of the pallet.

Abutting the pallet's trailing edge is an adjustable elevator 22 wherewith the pallet can be manipulated while under tow. In the preferred embodiment the receiving aircraft 50 adjusts the pallet's elevator 22 by remote control through a small motor and receiver installed on the pallet 10.

Figure 4B:
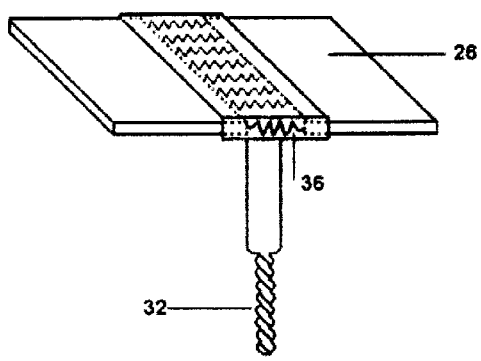

FIGS. 2 A and 7A show the pallet 10 supporting two structures in the shape of horizontal stabilizers. A freely rotating wheel 28 is partially and resiliently recessed into the roofs of these stabilizer/cushion 26 structures which are elastically mounted on shafts 32 that can be substantially depressed into the body of the pallet. FIG. 4B illustrates such a stabilizer/cushion 26 with a threaded shaft 32 intended for a shock-absorber element 36 inside the pallet. FIG. 2B is a frontal perspective of these small airfoils which supply the pallet 10 with additional lift and stability while serving as protective cushions.

Figure 3B:
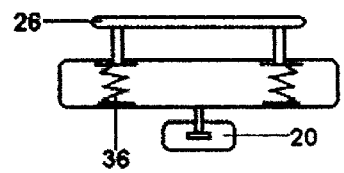

A large flat wing sits on a plurality of shafts 32 projecting out of the pallet 10 of FIG. 3A. The camber of this bi-wing matches that of the pallet and when depressed will conform to the contour of the pallet. Continuations of electric contacts, a fuel tube and latch fittings extend to the surface of the pallet along connection site 34 are continued through the thickness of this bi-wing. FIG. 3B reveals the flexible footing, within the body of the pallet, on which the shafts 32 of this bi-wing are mounted.

Figure 4A:
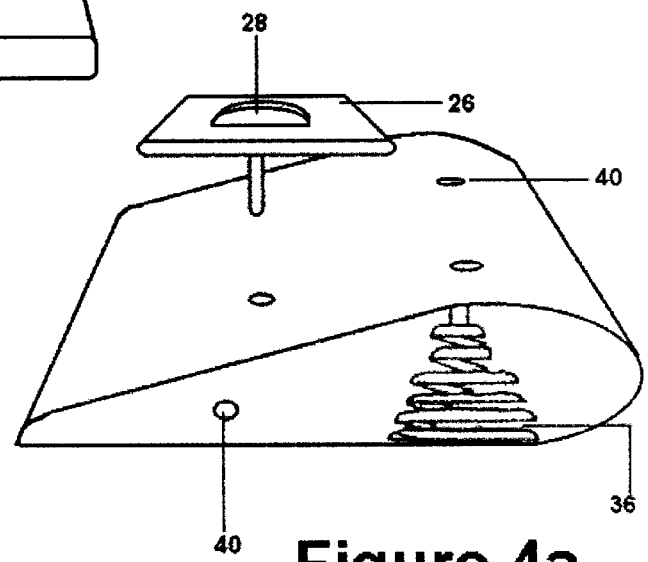
Figure 4C:
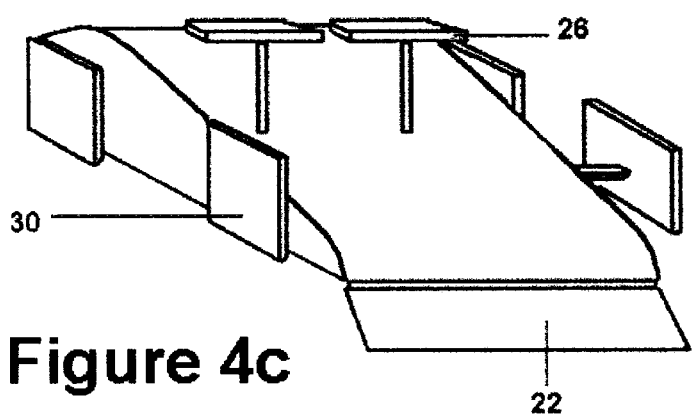
Figure 5:
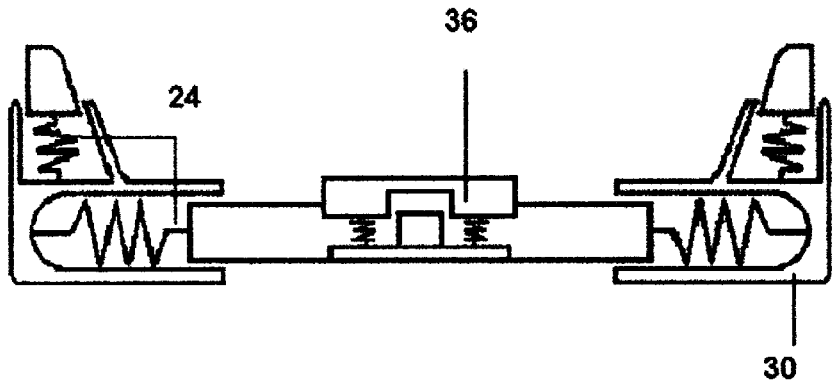
Figure 6A:
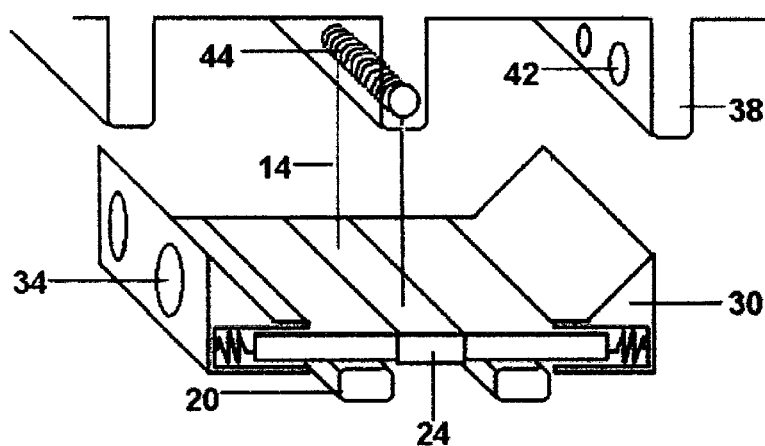
FIGS. 6A, 6B, 7A and 7B illustrate attachment of the pallet to a receiving aircraft.
Figure 6B:
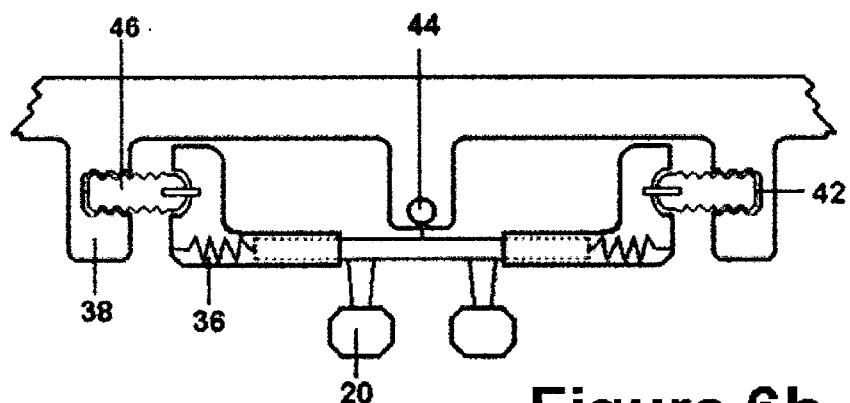

FIG. 4A pictures apertures 40 on the surfaces of the pallet 10 into which these stabilizer/cushions 26 are screwed. FIG. 4C pictures a pallet with these perpendicular elements doing dual duty as vertical winglet/cushions 30. In FIG. 5 these elements are more integrally incorporated as winglet/cushions 30 on the sides of the pallet and over its hard-point 24. Other pallet embodiments house hydraulic shock absorbers, and one employs the pallet's fuel cargo as hydraulic fluid.

The Drogue: The kind of drogue 18 commonly used in aerial refueling is pictured in FIG. 1A. It is attached to a tail cable 16 which originates on the pallet 10 and flows past the elevator 22.

Figure 8:
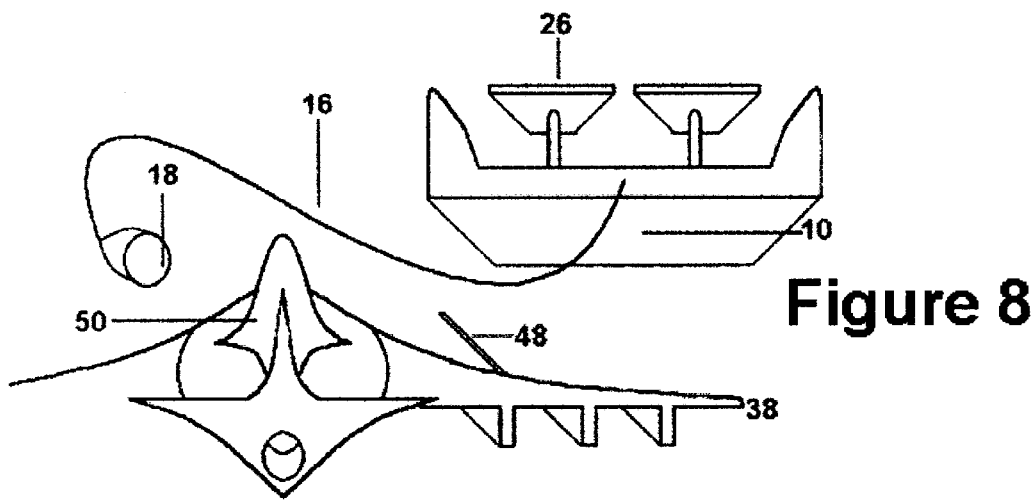
FIG. 8 illustrates capture of the pallet's drogue by a probe on the receiving aircraft.
Figure 9A:
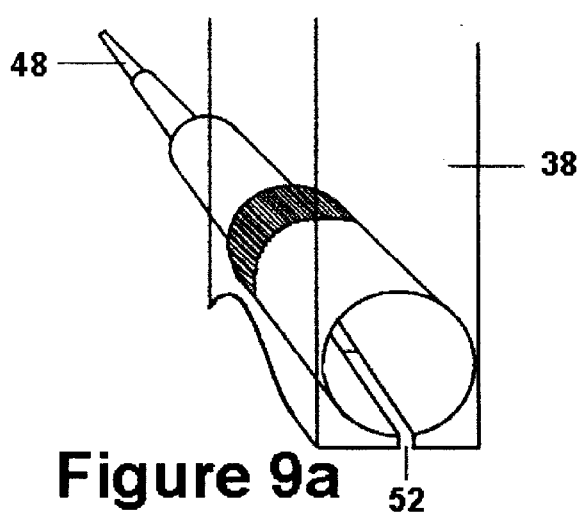
FIGS. 9A and 9B illustrate the hoist attached to the probe of the receiving aircraft.
Figure 9B:
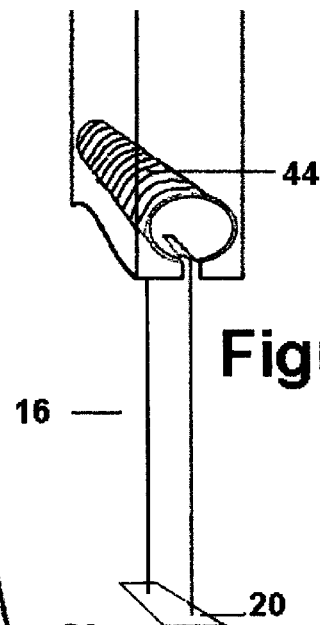

The Grappling Probe: FIG. 8 illustrates an aircraft approaching a drogue 18, its grappling probe 48 extended. In FIGS. 9A and 9B the telescoping and winch aspects of the probe are depicted The threaded sleeve is a reference to a motor shaft inside the pylon 38 whereby the probe projects itself beyond the pylon. Once the cable has been captured, the probe serves as an element of a hoisting mechanism 44 drawing the cable 16 through the cable channel 52.

A cockpit display transmitted by a a video camera trained on areas outside the pilot's field of vision helps the pilot finesse the pallet. Additionally, aspects of the docking process are automated by a laser distance,meter on the pod, and/or a transponder chip on the drogue, communicating with the autopilot.

Figure 7A:
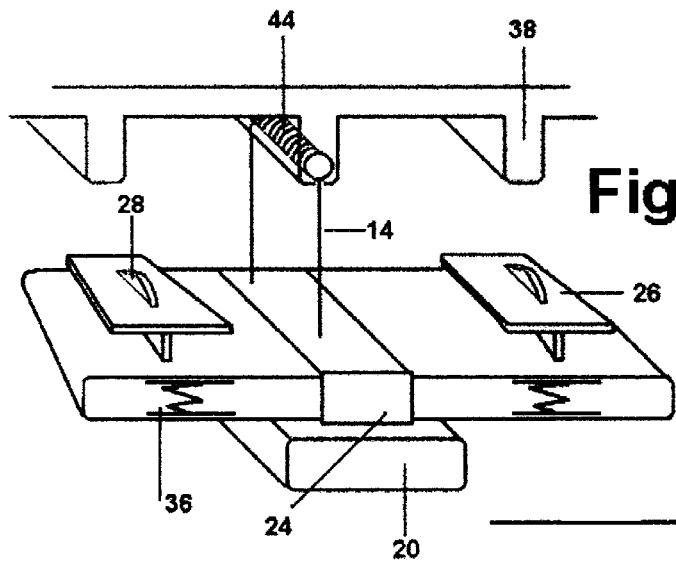
Figure 7B:
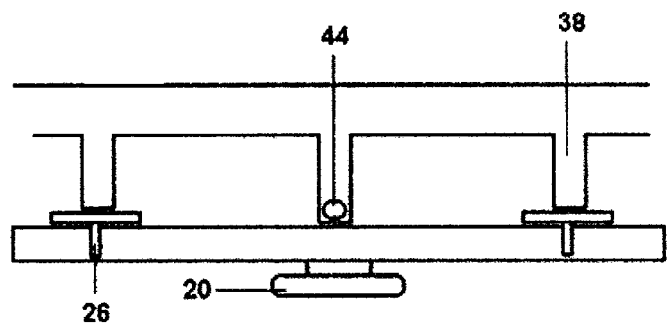
Figure 12A:
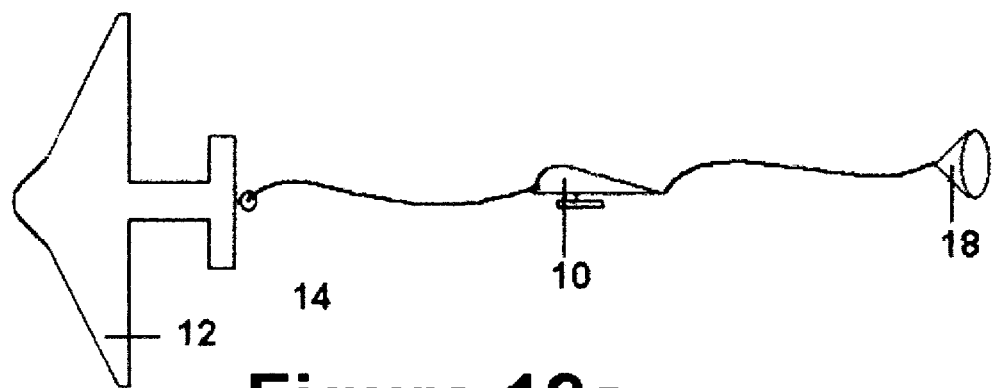
FIGS. 12A, 12B, 12C, 12D and 12E illustrate the transhipment process as a whole.
Figure 12B:
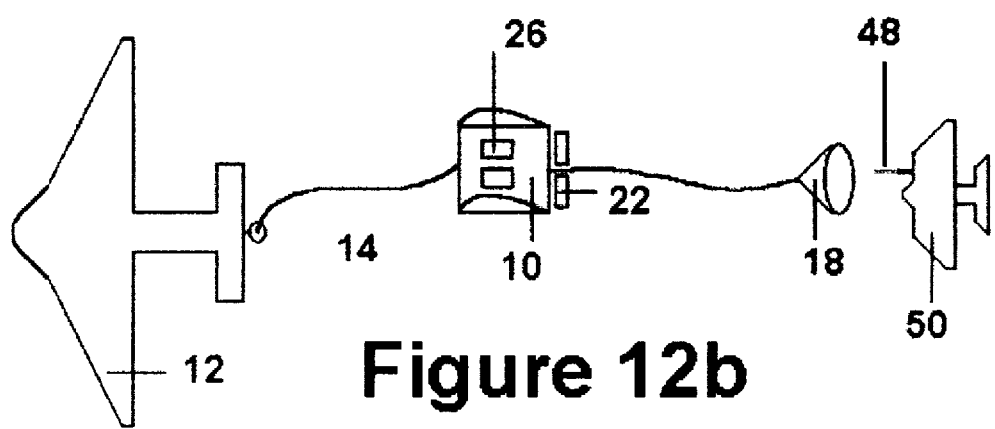
Figure 12C:
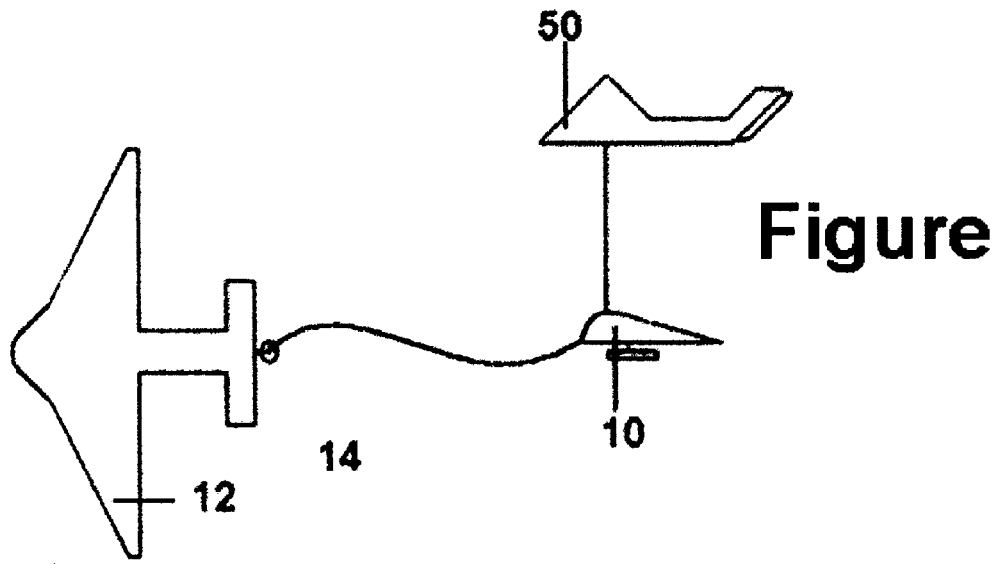
Figure 12D:
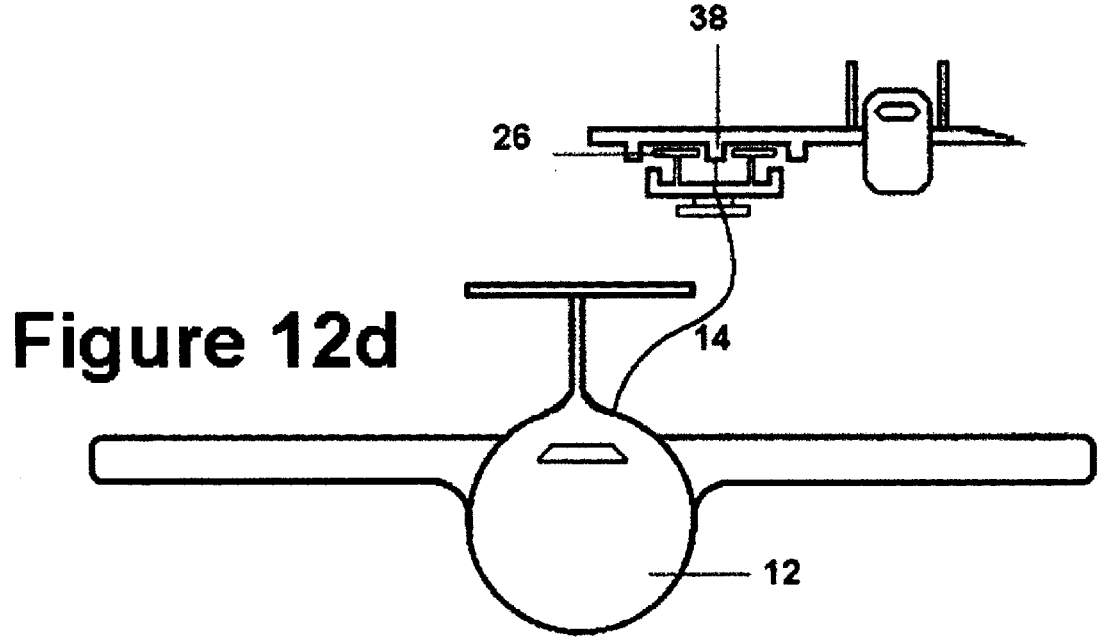
Figure 12E:
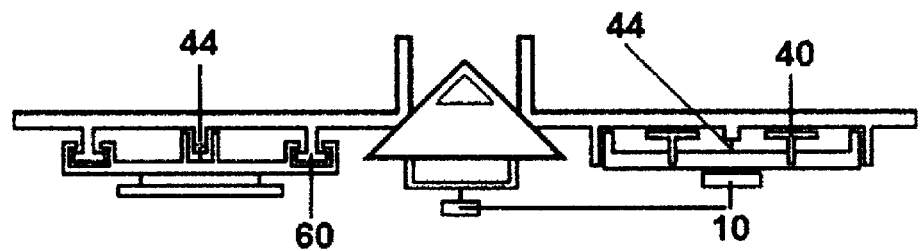

The Pylons: These house the retracted grappling probe 48, a hoist 44 mechanism and, on its sole, the bolt attachment 46 fittings and bolt housings 42. FIGS. 6A to 7B and 12D to 12E show pallets mating laterally as well as vertically with pylons. FIGS. 7A show the wheels 28 on a stabilizer/cushion 26 being used to slide a pallet into position. FIG. 12E depicts a pylon being treaded between two horizontal stabilizer, the wheels 28 of FIGS. 2A and 4A rolling underneath the wing.

Figure 10A:
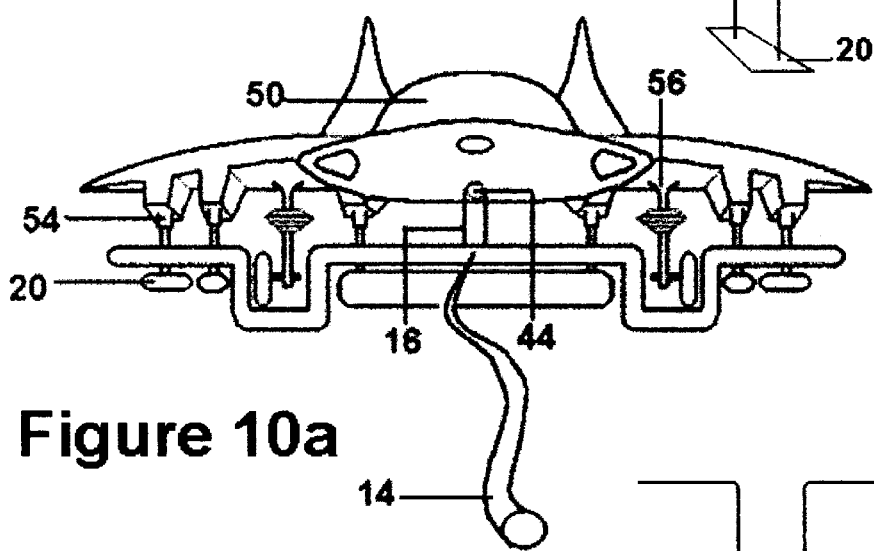
FIGS. 10A, 10B and 11 illustrate the attaching process using different shaped pallets.
Figure 10B:
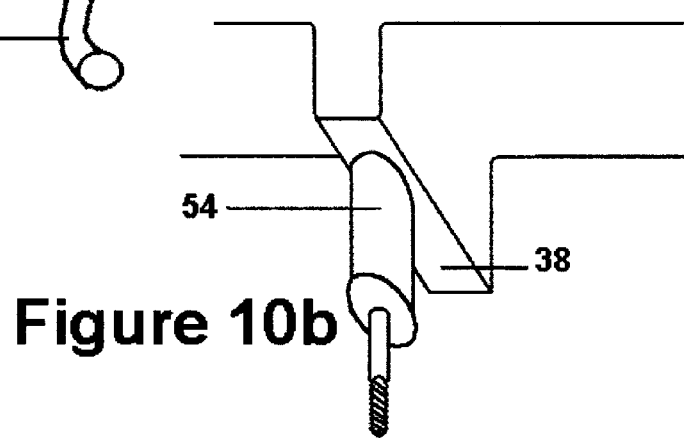

Finally, the bolt attachment 46 fittings on the undersurface of the pylons 38 (alternatively on the fuselage or an internal cargo area) are mobile in one embodiment wherein, as illustrated by FIG. 10B, they rotate out of their housing and project themselves towards the pallet. After inserting their bolts into the pallet's latches they rotate back with their load, assisted by the hoist 44.

Figure 11:
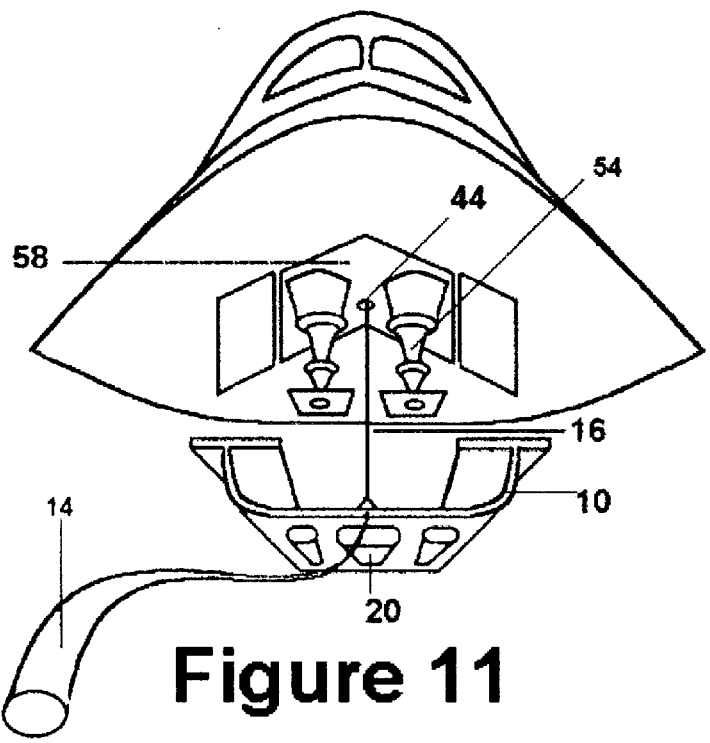

How it Works: After the drogue 18 is captured, but while the supply plane 12 retains the pallet 10 in tow, the receiving aircraft 50 flies directly over the pallet and maneuvers it against the aircraft's deployed landing gear 56, whereupon the supply plane's tether is disconnected. The hoist 44 continues to winch the pallet up against the gradually collapsing landing gear 56 until the aircraft's extension arms 54 and pallet's attachment surfaces meet and lock. For small pallets being raised towards a single wing this method applies without the landing gear, pulling the cargo into cargo hold 58 (FIG. 11). Alternatively, the receiving aircraft, while the pallet is still resiliently towed by the supply plane but after the drogue 18 has been captured, flies its pylon 38 in level flight directly into the longitudinal aisle formed by the two stabilizer/cushions 26 on the pallet 10, pulling the pallet into place as the supply plane yields tether 14 cable.

A third method (not shown) involves a fuselage mounted nose to tail grappling probe and a hoist extending to the plane's rear. After capturing the tethered drogue the aircraft a) overflies the pallet while b) translating the captured tow cable to the plane's rear, whereupon c) the pallet is disconnected from its supply plane tether, whereupon d) the pallet, wheeled stabilizer/cushion extending from its underside, trails the receiving aircraft. Aircraft having a rear cargo area may then pull the pallet aboard.

Conclusion: The foregone discussion, despite the numerous embodiments and examples cited is not exhaustive. Nor should the illustrations be construed as defining the scope of the invention or as excluding other applications, such as personnel transfer. The invention is accordingly not intended to be limited except as by the appended claims.

I claim:

1. A process for midair transfer of cargo between a supply plane and a receiving aircraft, said process comprising:
   providing a pallet for carrying said cargo, said pallet being comprised of:
      a cambered airfoil;
      a latch connection site for attaching to said receiving aircraft;
      control surfaces; and,
      a control system for moving said control surfaces;
   operatively connecting said cargo to said pallet;
   towing said pallet with a tether connected between said pallet and said supply plane;
   trailing a drogue behind said pallet with a tail cable originating from said pallet;
   remotely flying said pallet by actuating said control surfaces with said control system from said receiving aircraft;
   capturing said drogue with a grappling probe extended from said receiving aircraft;
   winching said cable, pulling said pallet towards said receiving aircraft;
   releasing said tether; and,
   attaching said pallet at said latch connection site to said receiving aircraft.

2. A process for midair transfer of cargo as in claim 1, wherein:
   said pallet includes a fuel tank and said cargo is fuel, whereby said step of operatively connecting said cargo to said pallet comprises filling said fuel tank with said fuel.

3. A process for midair transfer of cargo as in claim 1, wherein the steps of winching and attaching further comprise:
   deploying landing gear from said receiving aircraft;
   winching said cable with a motor operatively connected to said grappling probe until said pallet contacts said deployed landing gear; and,
   gradually collapsing said landing gear until said latch connection site of said pallet meets and locks with an extension arm extending from said receiving aircraft.

4. A process for midair transfer of cargo as in claim 1, further comprising:
   stabilizer/cushion assemblies resiliently mounted to an upper surface of said airfoil, said stabilizer/cushion assemblies each having one of said control surfaces attached to a trailing edge thereof; wherein,
   said step of remotely flying includes actuating the control surfaces attached to the stabilizer/cushion assemblies and said step of attaching said pallet to said receiving aircraft includes compressing said stabilizer/cushion assemblies between said receiving aircraft and said airfoil.

5. A process for midair transfer of cargo as in claim 4, further comprising a wheel mounted in each stabilizer/cushion assembly, whereby said step of attaching said pallet to said receiving aircraft includes sliding said pallet into position by rolling said wheels along a portion of said receiving aircraft.

6. A process for midair transfer of cargo between a supply plane and a receiving aircraft, said process comprising:
   providing a pallet for carrying said cargo, said pallet being comprised of:
      an airfoil shaped container;
      a latch connection site for connecting to said receiving aircraft;
      at least one adjustable control surface;
   operatively connecting said cargo to said pallet;
   towing said pallet with a tether connected to said pallet and said supply plane;
   trailing a drogue behind said pallet with a tail cable originating from said pallet;
   maneuvering said pallet by means of said at least one adjustable control surface;
   capturing said drogue with a grappling probe extended from said receiving aircraft;
   winching said cable, pulling said pallet towards said receiving aircraft;
   releasing said tether; and,
   attaching said pallet at said latch connection site to said receiving aircraft.

7. A process for midair transfer of cargo as in claim 6, wherein:
   said airfoil shaped container is cambered.

8. A process for midair transfer of cargo as in claim 6, further comprising:

a control system for moving said at least one adjustable control surface, wherein said step of maneuvering said pallet comprises remotely actuating said at least one control surface with said control system from said receiving aircraft.

9. A process for midair transfer of cargo as in claim 6, further comprising:

a control system for moving said at least one adjustable control surface, wherein said step of maneuvering said pallet comprises remotely actuating said at least one control surface with said control system from said supply plane.

* * * * *